Patented Sept. 26, 1933

1,928,229

UNITED STATES PATENT OFFICE 1,928,229

PROCESS OF CURING RIPE OLIVES

Boyd Preble, Long Beach, Calif.

No Drawing. Application August 3, 1931
Serial No. 554,943

4 Claims. (Cl. 99—8)

This invention relates to a process of curing ripe olives, and particularly to a process whereby a dark color is imparted to the olives. In curing ripe olives, it is essential that they have a glossy black color when completed in order to produce a marketable product.

An object of my invention is to provide a process of curing ripe olives in which there is a material saving in time, a substantial reduction in the number of applications of caustic soda, and a glossy black color when the process is completed.

Another object is to provide a process in which there is a substantial saving in the materials used, and also a product is provided having a better taste.

Other objects, advantages, and features of invention may appear in the subjoined detailed description, and the appended claims.

The process heretofore in use consisted of placing the ripe olives in a vat and covering them with a solution of caustic soda. A number of applications of caustic soda were applied, depending upon the variety and size of the olives. Sometimes as many as fifteen applications are required. This, of course, required many days of time. Where more than one application of sodium hydroxide was used a period of from several hours to several days was allowed, during which the olives were exposed to the air and oxidized in order to obtain a dark color. The number of applications of caustic soda to the olives was continued until the caustic soda had penetrated into and thru the pit of the olive in order to neutralize the bitterness in a normal uncured olive. These caustic soda treatments were made at normal room temperature.

After the caustic soda treatment the olives were washed in cold water at normal room temperature to remove the caustic soda or to neutralize the same.

The method heretofore in use of curing ripe olives consisted in several short applications of caustic soda as stated above, with about a 24 hour air exposure period between each application. This method required from 15 to 30 days to complete and gave a percentage of black olives varying from 40% to 90% depending on the condition of the fruit. Other items entering into the process are the chemical composition of the water used and the expertness of the person handling the caustic soda applications, and also the arrangement of steps in the process.

In my process the number of caustic soda applications is reduced to a minimum. The first step consists in placing the ripe olives in a shallow vat and covering them with a caustic soda solution of from ½ to 2% per pound. One such application of caustic soda is sufficient for most of the fruit with perhaps 2 or 3 for larger and more tender varieties. The fruit is not exposed to the air between the caustic soda applications. As soon as the caustic soda has reached the pit of the olive, I immediately start washing out with hot water at temperatures varying up to 212 degrees Fahrenheit. As soon as the olives show that they are practically free of caustic soda, I treat them with a solution of pyrogallol, or one of its derivatives. The pyrogallol solution varies from ½% to 5% per pound. Other derivatives of pyrogallol may be acid pyrogallic $C_6H_3(OH)_3$ or gallic acid $C_6H_2(OH)_3CO_2H.H_2O$ 3:4:5. The olives remain in the pyrogallol solution for a period varying from five minutes to several hours depending on the size and variety of the olives. That is, until the olives have absorbed enough of the above solution to give a desired reaction to the successive treatments. The pyrogallol treatment may be given at normal room temperature or at temperatures up to 212 degrees Fahrenheit.

As soon as the olives have absorbed a quantity of pyrogallol, they are at once given a short application of a weak caustic soda solution (normally less than 1% per pound). This caustic soda solution is given at normal room temperature. This last caustic soda solution is allowed to remain on the fruit until it penetrates just below the skin. As soon as the caustic soda has penetrated thru the skin, the solution is drawn off and the olives are exposed to the air for a few hours, at the end of which time they have a glossy black color resulting from the oxidizing action of the air with the mixture of pyrogallol, caustic soda, and the natural elements of the olives.

When this exposure period is finished, the olives are again treated with water at either normal atmospheric temperature or temperatures up to 212 degrees Fahrenheit until all the caustic soda is again removed. When free of caustic soda, the olives are boiled at 212 degrees Fahrenheit for approximately one-half hour, after which they are treated with a weak salt solution until salty enough to suit the average taste. The olives are now ready to be canned or otherwise dispensed.

With my process, in addition to materially reducing the treatment time, I secure practically 100% glossy black olives having a better taste and consequently a more marketable product. Another advantage in my process is that the olives have an even black color which will not fade out or otherwise return to their natural or a brownish color.

Having described my invention, I claim:

1. In the process of curing ripe olives, comprising treating the olives with caustic soda and the addition of a treatment of pyrogallol solution substantially as described.

2. The process of curing ripe olives which comprises first immersing the olives in a caustic soda solution, then washing with the caustic soda, then immersing the olives in a pyrogallol solution, then immersing the olives in a second caustic soda solution, then exposing the olives to the air, and then washing the olives in water.

3. The process of curing ripe olives which comprises first immersing the olives in a caustic soda solution until the caustic soda has reached the pit of the olives, then washing out the caustic soda until the olives are almost free of said caustic soda, then immersing the olives in a pyrogallol solution, then immersing the olives in a weak caustic soda solution, then exposing the olives to the air until a glossy black color results, then washing the olives with water until all the caustic soda is removed then boiling the olives and then immersing the olives in a salt solution.

4. The process of curing ripe olives which consists in immersing the olives in a pyrogallol solution subsequent to a caustic soda treatment, then oxidizing the pyrogallol whereby a glossy black color is imparted to the olives.

BOYD PREBLE.